Patented Feb. 1, 1927.

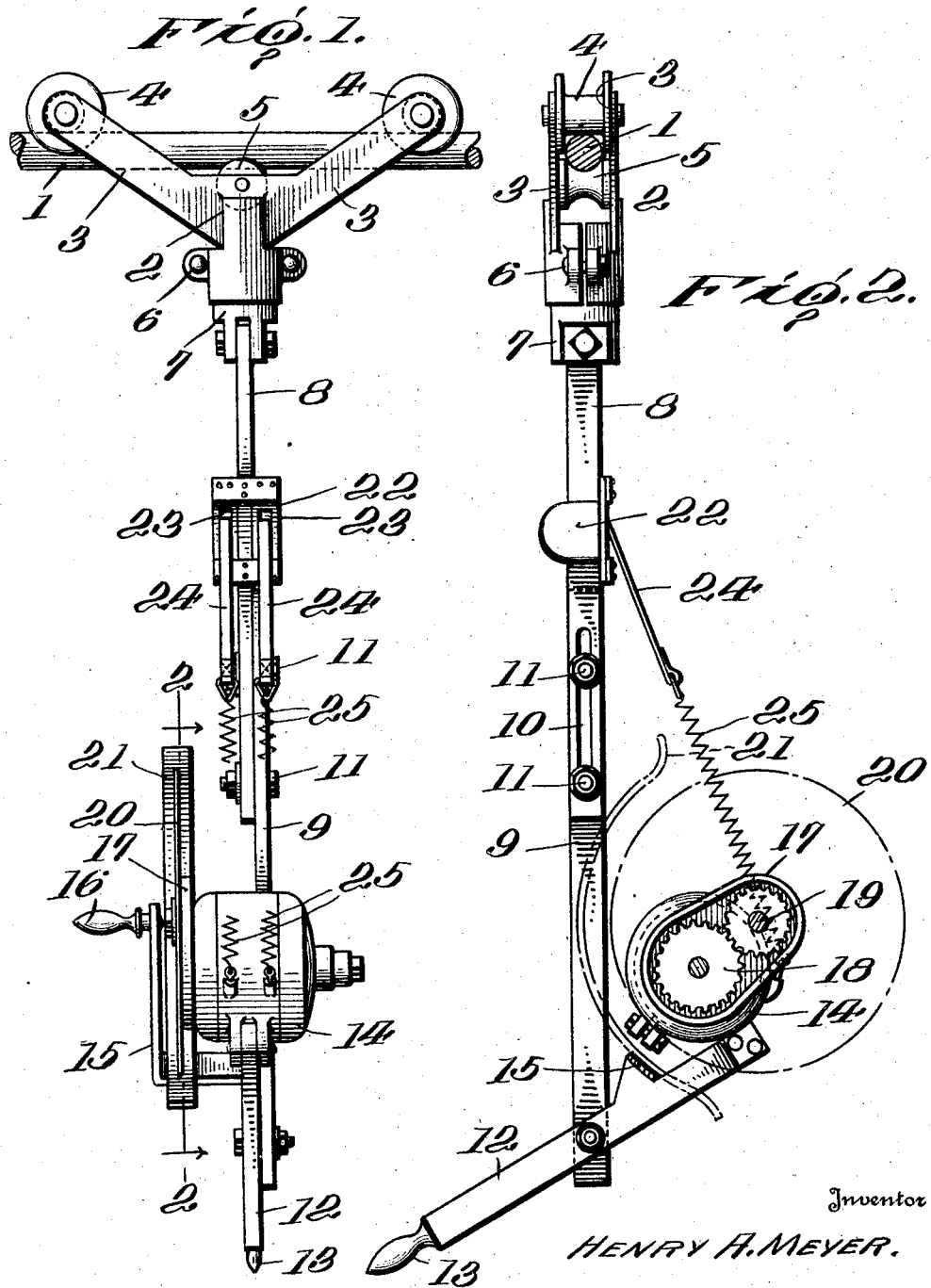

1,616,058

UNITED STATES PATENT OFFICE.

HENRY ANDREW MEYER, OF CINCINNATI, OHIO, ASSIGNOR TO THE WOLF MACHINE COMPANY, OF CINCINNATI, OHIO, A CORPORATION OF OHIO.

CARCASS SPLITTER.

Application filed July 3, 1926. Serial No. 120,400.

This invention relates to means for dividing or splitting animal carcasses in the process of butchering, and has for its object the provision of a power-driven apparatus of inexpensive construction which may be readily suspended to travel with the carcass and easily manipulated to make a clean cut in the carcass.

One embodiment of the invention is illustrated in the accompanying drawing and will be fully described, the novel features being particularly pointed out in the appended claims.

In the drawing:

Figure 1 is a front elevation of the apparatus;

Fig. 2 is a side elevation, with parts in section approximately on the line 2—2 of Fig. 1.

In butchering operations, the carcass to be divided is suspended from an overhead conveyor, and it is common practice to provide a track parallel with the conveyor upon which a cutter may travel to act upon the carcass as it moves with the conveyor.

In the annexed drawing, the reference numeral 1 indicates a track rod of circular cross section which is secured in any convenient manner across the butchering room near the ceiling and parallel with the carcass conveyor. A carriage 2 is mounted to travel along the track and comprises two side plates 3 each having widely-diverging arms between which at the ends thereof are mounted grooved rollers 4 resting on the track and supporting the carriage for movement along the same. At the center of the carriage is a grooved roller 5 which runs against the under side of the track and thereby prevents the carriage rising from the track. This arrangement of grooved rollers on a track of circular cross section permits a side swing of the carriage on the track, transversely thereof, in the event that the carcass being treated on a parallel track is somewhat out of reach. For ease of movement, the rollers may be provided with anti-friction bearings. The lower central portions of the carriage are secured together by clamp-bolts 6 and are formed into or carry a socket 7 in which is secured the upper end of a hanger or suspension bar consisting of upper and lower similar members 8 and 9, the upper member having a longitudinal slot 10 in its lower portion and the lower member having a similar slot in its upper portion. Clamping bolts 11 are inserted through the slots and secure the members together in an obvious manner, the arrangement permitting the hanger to be easily and quickly adjusted to the height of the ceiling.

Pivoted or hinged to the lower end of the hanger in any preferred manner is a lever or rocking arm 12 which is provided at its rear end with a handle or grip 13 and has its front end firmly secured to the frame or housing of an electric motor 14 which may be of any well-known or approved type and is illustrated conventionally. Between the fulcrum and the front end of the arm 12, a bracket or frame 15 is formed integral therewith or secured rigidly thereto and extends laterally therefrom to provide an arm having a handle 16 at its end and lying in a vertical plane parallel with the plane of the rocking arm 12 and following a line extending upwardly and forwardly relative to the rocking arm. Between the motor and the bracket, a gear case 17 is carried by the end of the motor and houses a train of gearing, indicated at 18, operatively connecting the motor shaft with a saw arbor 19 upon which is secured a circular saw 20, and a bowed spring 21 is secured to the bracket 15 and extends over the saw so as to protect the operator from contact with the saw teeth and consequent injury.

Secured upon the upper portion of the hanger is a housing 22 containing a spring drum which may be of any well-known construction. Secured to the drum to wind thereon and passing through slots 23 in the housing 22 are straps 24 which extend downwardly and forwardly and are connected through coiled springs 25 with the motor casing, the motor and cutter being thus supported in such a manner as to be cushioned against the shock and resistance offered by the work and also counter-balanced so that it may be easily swung up out of the way when not in use.

When the machine is at rest, it will hang from the track substantially perpendicularly. When a carcass is to be cut, the operator grasps the handle 13 with his left hand and the handle 16 with his right hand and presses forward thereon to swing the entire apparatus toward the carcass about the track as a center. Having thus brought the saw or cutter into the proper position over the carcass, an upward pull is exerted upon the handle 13 and the handle 16 is pushed forwardly and downwardly to bring the cutter into engagement with the carcass and cause it to divide the same. It will be understood, of course, that the operator will move the cutting apparatus along the track at the same speed as the carcass travels so that the carcass will be divided without any interruption to its movement. When the cutting has been finished, the force applied to the handles 13 and 16 is relaxed and the spring drum will act to raise the cutter and motor out of the way. The operator, however, will push the machine back along the track to its starting point to repeat its operation upon a second carcass. The device can be made to cut through the entire length of the carcass, but many packers object to such operation because the bone-dust clings to the carcass and makes it unclean and unsightly. For this reason, a cut of about one foot through the rump suffices, the division being completed by the use of the cleaver.

My apparatus is exceedingly simple and may be easily installed and manipulated. It is efficient in use and may be produced and installed at a low cost.

It is to be understood that various changes and modifications in the structure as shown could be made and it is not intended to limit the accompanying claims to the structure shown, as it is obvious modifications and changes could be made without departing from the spirit and scope of the invention. For example, it is obvious and it is applicant's intention to cover a structure wherein the motor might be attached to the hanger itself rather than to the swinging arm and the saw or cutter mounted on the swinging arm connected for driving operation with the shaft of the motor by means of a chain drive mounted on a sprocket on the end of the motor and the shaft of the saw. The sprockets might vary in size so as to vary the speed of the saw. Also instead of a chain drive in this connection we might readily utilize shafting properly mounted and carrying bevel gearing and similar results accomplished.

Having thus described my invention what I claim as new and desire to secure by Letters Patent of the United States is:

1. The combination of a track, a carriage mounted to travel along the track and to swing about the same, a hanger secured to and depending from the carriage, and a cutter and motor therefor mounted at the lower end of the hanger for swinging movement relative to the hanger.

2. The combination of a track, a carriage mounted thereon, a hanger pivoted on the carriage for movement transverse to the track, a rocking arm mounted at the lower end of the hanger, and a cutter and motor therefor carried by said arm.

3. The combination of a track, a carriage thereon, a hanger pivoted on the carriage for movement transverse to the track, a cutter and motor therefor mounted on the lower end of the hanger, and means for moving the same downwardly and forwardly whereby the cutter may be engaged with and moved through the work.

4. The combination of a track, a carriage thereon, a hanger depending from the carriage, a cutter and motor therefor mounted on the lower end of the hanger, and means for moving the same downwardly and forwardly whereby the cutter may be engaged with and moved through the work, and means for withdrawing the cutter from the work.

5. The combination of a track, a carriage mounted thereon, a hanger depending from the carriage, a rocking arm mounted at the lower end of the hanger, and a cutter and motor therefor carried by said arm, and a yieldable connection between the rocking arm and the hanger.

6. The combination of a track, a carriage mounted thereon, a hanger depending from the carriage, a rocking arm mounted at the lower end of the hanger, and a cutter and motor therefor carried by said arm, and a lateral bracket on the arm adjacent the motor and provided with a handle, the arm being provided with a handle at its end remote from the motor.

7. The combination of a track, a carriage mounted thereon, a hanger depending from the carriage, a rocking arm mounted at the lower end of the hanger, and a cutter and motor therefor carried by said arm, a spring drum mounted on the hanger, and a strap wound on the drum and connected with the arm.

8. The combination of a track, a carriage mounted to travel along the track and swing about the same, a hanger pivoted on the carriage for movement transverse to the track, a rocking arm mounted at the lower end of the hanger, and a cutter and motor therefor carried by said arm.

9. The combination of a track, a carriage thereon, a hanger depending from the carriage, a rocking arm mounted between its ends at the lower end of the hanger, a motor secured upon the front end of said arm, a bracket on the side of the arm, a cutter between the motor and said bracket, and a gear case carried by the frame of the motor and housing gearing connecting the motor with the cutter, whereby to provide a compact operating unit.

In testimony whereof I hereunto affix my signature.

HENRY ANDREW MEYER.